(12) United States Patent
Segars

(10) Patent No.: US 6,405,321 B1
(45) Date of Patent: Jun. 11, 2002

(54) DATA PROCESSING APPARATUS AND TESTING METHOD

(75) Inventor: Simon Anthony Segars, Cambridge (GB)

(73) Assignee: Advanced Risc Machines Limited, Cambridge (GB)

( * ) Notice: Subject to any disclaimer, the term of this patent is extended or adjusted under 35 U.S.C. 154(b) by 1495 days.

(21) Appl. No.: 08/656,544

(22) Filed: May 30, 1996

Related U.S. Application Data

(63) Continuation of application No. 08/308,557, filed on Sep. 19, 1994, now abandoned.

(30) Foreign Application Priority Data

Apr. 25, 1994 (GB) .............................................. 9408159

(51) Int. Cl.[7] .............................................. G06F 1/12
(52) U.S. Cl. ..................................................... 713/400
(58) Field of Search ................................. 395/556, 559, 395/580; 713/400

(56) References Cited

U.S. PATENT DOCUMENTS

| | | | | |
|---|---|---|---|---|
| 4,641,308 A | * | 2/1987 | Sacarisen et al. ...... | 395/200.21 |
| 4,947,395 A | * | 8/1990 | Bullinger et al. .......... | 371/22.3 |
| 5,155,841 A | * | 10/1992 | Bumbarger ................. | 395/556 |
| 5,163,146 A | * | 11/1992 | Antanaitis, Jr. et al. .... | 395/556 |
| 5,185,516 A | * | 2/1993 | Saito ......................... | 235/380 |
| 5,329,471 A | * | 7/1994 | Swoboda et al. ............ | 364/578 |
| 5,355,369 A | * | 10/1994 | Greenber et al. .......... | 371/22.3 |
| 5,357,626 A | * | 10/1994 | Johnson et al. ........ | 395/183.09 |
| 5,381,420 A | * | 1/1995 | Henry ....................... | 371/22.3 |
| 5,428,626 A | * | 6/1995 | Frisch et al. ................... | 371/27 |
| 5,428,800 A | * | 6/1995 | Hsich et al. ................. | 395/775 |
| 5,475,324 A | * | 12/1995 | Tomiyori .................... | 327/145 |
| 5,479,645 A | * | 12/1995 | Sakai et al. ................. | 395/556 |
| 5,479,648 A | * | 12/1995 | Barbera et al. ............. | 395/750 |
| 5,561,792 A | * | 10/1996 | Ganapathy ................... | 395/556 |
| 5,564,042 A | * | 10/1996 | Ventrone et al. ............ | 395/556 |

FOREIGN PATENT DOCUMENTS

| | | | | |
|---|---|---|---|---|
| EP | 0 313 848 A2 | 5/1989 | ........... | G06F/11/00 |
| GB | 2 266 606 A | 11/1993 | ........... | G06F/11/22 |

OTHER PUBLICATIONS

Ken Marrin, "DSP development tools engage mainstream designers," Computer Design, vol. 32, No. 1, Jan. 1993, Tulsa, Oklahoma, pp. 65–74.

Dave Bursky, "Dedicated Emulation Logic on Chip Debugs Digital Processor's Hardware and Software," Electronic Design, vol. 38, No. 9, May 10, 1990, Cleveland, Ohio, pp. 29–30.

* cited by examiner

*Primary Examiner*—St. John Courtenay, III
(74) *Attorney, Agent, or Firm*—Fenwick & West, LLP

(57) ABSTRACT

A data processing apparatus comprising an integrated circuit 2 having a processor core 4 surrounded by a scan chain 10 is described. The processor core 4 can execute program instructions using either a system clock signal MClk or a test clock signal DClk. A clock selecting bit S within the program instructions for test operation indicates which clock is to be used and a clock selecting mechanism 12, 14 selects the indicated clock signal and passes this to the processor core 4. When the system clock MClk is selected execution of the program instruction by the processor core 4 may be coordinated with the operation of connected auxiliary circuits such as a DRAM 6.

8 Claims, 2 Drawing Sheets

DATA PROCESSING APPARATUS AND TESTING METHOD

RELATED APPLICATIONS

This is a continuation of application Ser. No. 08/308,557 filed on Sep. 19, 1994 now abandoned.

BACKGROUND OF THE INVENTION

1. Field of the Invention

This invention relates to the field of testing data processing apparatus. More particularly, this invention relates to testing data processing hardware.

2. Description of the Prior Art

It is known to provide microprocessor based systems with debugging functions that allow the user to interrogate the state of the processor core. Such debugging systems allow the processor core to be isolated from other parts of the data processing apparatus and, by forcing the processor core to execute certain instructions, the internal state of the processor core may be made visible.

In systems such as the AMD29200 integrated circuit produced by Advanced Micro Devices, these debug instructions are not loaded into the processor core via the normal data/instruction bus. Rather, the debug instructions are serially loaded via a scan chain of the JTAG type and then scanned onto the instruction/data bus. The serial loading of the instructions into the scan chain takes place under control of a test clock signal coordinated with the external device that is providing the serial instructions. The instructions which are loaded in this way execute at a much slower speed than is usual since, for example, for a 32-bit instruction 32 test clock cycles are needed to load the instruction before a test clock signal may be issued to the core to cause it to execute the instruction.

SUMMARY OF THE INVENTION

An object of the invention is to address the abovementioned problem.

Viewed from one aspect the invention provides apparatus for processing data, said apparatus comprising:

(i) a processor core operable under control of program instructions;

(ii) means for supplying a system clock signal to said processor core;

(iii) means for supplying a test clock signal to said processor core; and (iv) clock selecting means for selecting between said system clock signal driving operation of said processor core and said test clock signal driving operation of said processor core, (v) wherein said clock selecting means selects said system clock signal during normal operation and said test clock signal during loading of program instructions during test operation, said clock selection means being responsive to one or more clock selecting bits within a program instruction to be executed during said test operation to select either said test clock signal or said system clock signal for driving said processor core to execute that program instruction.

Providing this clock selecting feature allows the processor core to execute the instructions once loaded in accordance with the true system clock signal which it would use during normal operation. In this way, a more realistic test of the processor core operation may be made.

Particularly preferred embodiments of the invention are ones comprising at least one auxiliary circuit coupled to said processor core and driven by said system clock signal, said clock selecting means selecting said system clock signal during test operation to execute program instructions that use said auxiliary circuit.

The invention provides the highly desirable ability to examine the state of auxiliary circuits coupled to the processor core as well as the processor core itself. Processor cores may be fully static enabling them to utilise the external test clock signal, but auxiliary circuits of the type that are used with processor cores do not necessarily have this capability (e.g. DRAM requires continual refreshing at the system clock rate). Generally speaking the coordination of the operation of the processor core with its associated auxiliary circuits is delicate and one is less able to deviate from the system clock, e.g. data transfers must be synchronized with both the core and the auxiliary circuit utilising the same clock signal.

The invention provides the capability to load the instructions using the test clock signal and yet switch to execute those instructions with the system clock signal. This increases the utility of the test analysis that may be performed in this manner.

As suggested above, the auxiliary circuits coupled to the processor core may take many forms. However, the invention is particularly suited to systems in which the auxiliary circuits include memory circuits and coprocessors. Such auxiliary circuits may be fabricated on the same integrated circuit as the processor core and so analyzing the interaction between these circuits and the processor core would be very difficult to achieve in other manners.

In preferred embodiments of the invention there is provided an instruction pipeline via which program instructions are fed to said processor core, said clock selecting means receiving said one or more clock selecting bits from that pipeline stage of said instruction pipeline holding a next instruction to be executed by said processor core.

High performance microprocessors include instruction pipelines to increase processing speed. An instruction pipeline can be advantageously utilised by the invention to effectively buffer the clock selecting bits together with their associated program instructions in a manner that assists a smooth change in clock signal when this is required.

It will be appreciated that each program instruction during test operation may be loaded from the debugging control system in different ways, e.g. in parallel via a dedicated bus. However, it is particularly advantageous to provide a system in which during test operation, each program instruction, including said one or more clock selecting bits, is serially loaded under control of said test clock prior to being applied to said processor core.

Serial loading of the program instructions during test operation reduces the pin count of the device so easing a design constraint.

In preferred serial loading embodiments it is advantageous to provide a test scan chain into which said program instructions are serially loaded during test operation.

A test scan chain can be used for other functions, such as signal capture and stimulus application during hardware test. Thus, the test scan chain can be made to perform more than one role and so provide greater functionality for the area of chip surface that it occupies.

It will be appreciated that during normal operation the clock selecting bits will be irrelevant since normal operation utilises the system clock signal. Accordingly, in preferred embodiments, during normal operation, each program instruction is loaded in parallel from a program memory, said one or more clock selecting bits being separately added to said program instructions read from said program memory.

Adding the clock selecting bits after loading the program instructions means that the memory storing the program instructions for use in normal operation need not store the clock selecting bits which are redundant since they have the same value for such normal operation program instructions. In this way, the storage capacity of the program memory is better utilised.

Viewed from another aspect the invention provides a method of processing data, said method comprising the steps of:

(i) operating a processor core under control of program instructions;

(ii) supplying a system clock signal to said processor core;

(iii) supplying a test clock signal to said processor core; and (iv) selecting between said system clock signal driving operation of said processor core and said test clock signal driving operation of said processor core, (v) wherein said system clock signal is selected during normal operation and said test clock signal is selected during loading of program instructions during test operation, one or more clock selecting bits within a program instruction to be executed during said test operation controlling selection of either said test clock signal or said system clock signal for driving said processor core to execute that program instruction.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
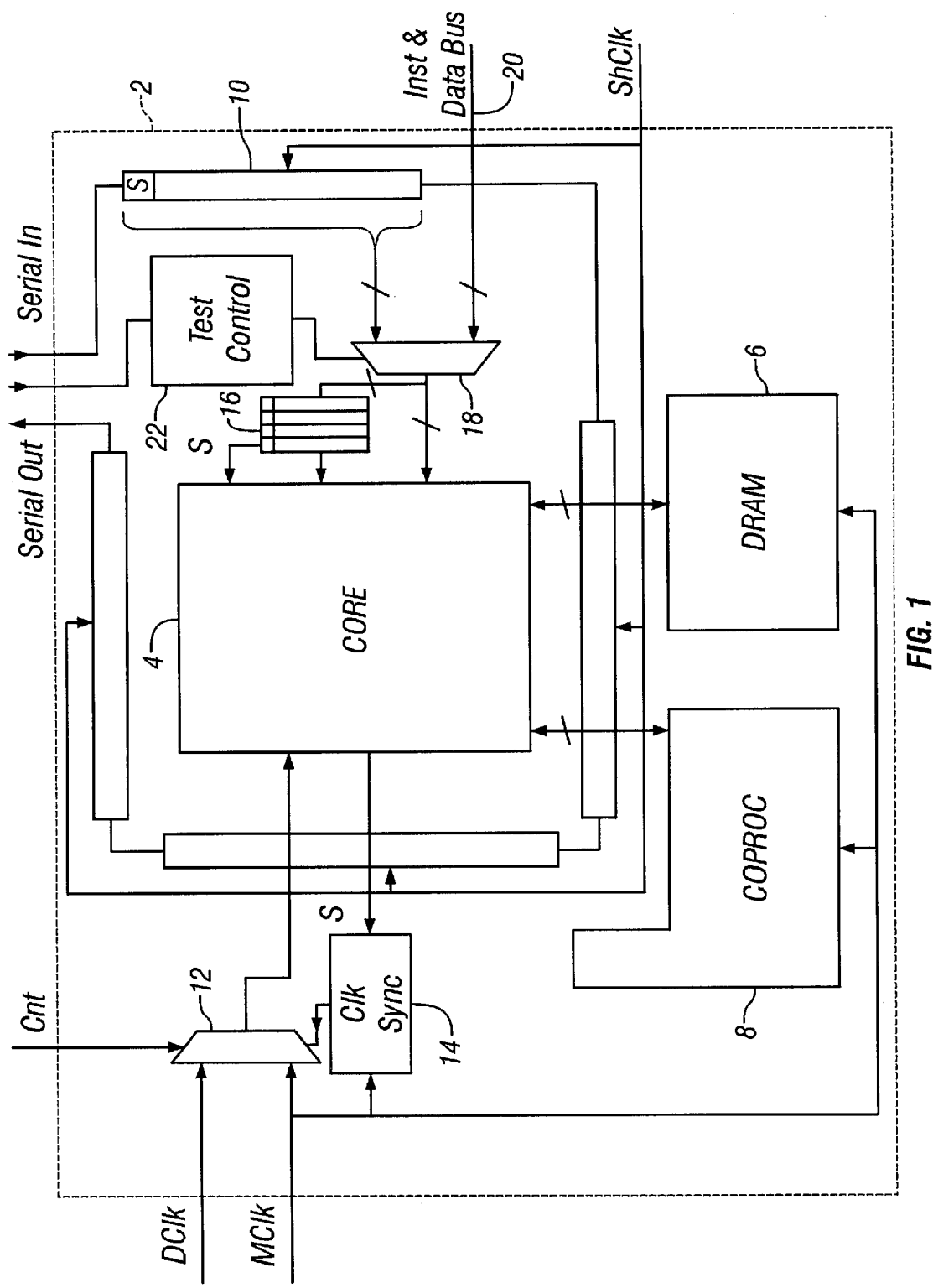
FIG. 1 illustrates an integrated circuit having a processor core operable in a normal mode and a test mode.

FIG. 1 shows an integrated circuit 2 having a processor core 4. Auxiliary circuits in the form of a dynamic random access memory (DRAM) 6 and a coprocessor 8 are bi-directionally coupled to the processor core 4. A JTAG style scan chain 10 is provided around the processor core 4.

A system clock signal MClk and a test clock signal DClk are input to a clock multiplexer 12 that is switched either under the influence of a external control signal Cnt or an internal control signal generated by a clock synchroniser 14. The coprocessor 8 and the DRAM 6 are permanently supplied with the system clock signal MClk.

Program instructions are supplied to the processor core 4 via an instruction pipeline 16. The instruction pipeline 16 is filled by a program instruction multiplexer 18 that selects program instructions either from an instruction and data bus 20 or from a section of the scan chain 10. The output from the program instruction multiplexer 18 also passes directly to the processor core 4 to take account of the nature of the instruction and data bus 20 in that it also serves to carry data words that are passed directly into and out of the processor core 4 without going through the instruction pipeline 16. The program instruction multiplexer 18 is switched by test control logic 22 that serves to select program instructions that have been serially loaded into the scan chain 10 when in a test mode of operation rather than program instructions from the instruction and data bus 20 as used during normal operation. The test control logic 22 is itself driven by an external de-bugging controller (not illustrated).

The processor core 4 operates using what would normally be considered to be a 32-bit instruction set. The 32-bit program instructions are modified by the addition of a clock selecting bit S at one end of the program instruction. This produces 33-bit program instructions. The clock selecting bit S is utilised to flag whether the program instruction to which it is attached should be executed using the system clock signal MClk or the test clock signal DClk. The clock selecting bit S is output from the last stage of the instruction pipeline 16 to the processor core 4 from where it emerges to the clock synchronizer 14. The clock synchronizer 14 acts upon receipt of a clock selecting bit indicating that the system clock signal should be used to switch the clock multiplexer 12 to the system clock MClk when the first valid system clock pulse becomes available. The clock synchronizer 14 serves to prevent a system clock pulse being directed to the processor core 4 that could not be reliably acted upon (e.g. the rising edge of the asynchronous system clock signal occurred too soon after the falling edge of the test clock signal DClk on which the processor core 4 was previously acting).

In use, program instructions during test operation are serially loaded into the scan chain 10. 33 scan chain cells of the scan chain 10 serve to store one complete program instruction (S bit and 32-bit instruction) which when fully loaded is switched in parallel via the program instruction multiplexer 18 to the input of the instruction pipeline 16. When that instruction reaches the front of the instruction pipeline ready for execution, its clock selecting bit S is used to control the clock multiplexer 12 to select either the system clock signal MClk or the test clock signal DClk to provide the pulse necessary to execute that program instruction within the processor core 4.

In the case of a program instruction that involves either of the DRAM 6 or the coprocessor 8, the system clock signal MClk is utilised. For example, in the case of a memory access to the DRAM 6, the DRAM must be continuously refreshed and may only be accessed at certain times within this refresh cycle. Accordingly, the same clock signal must be used for the processor core 4 as for the DRAM 6 in order that such a memory access can be properly synchronised.

Figure 2:
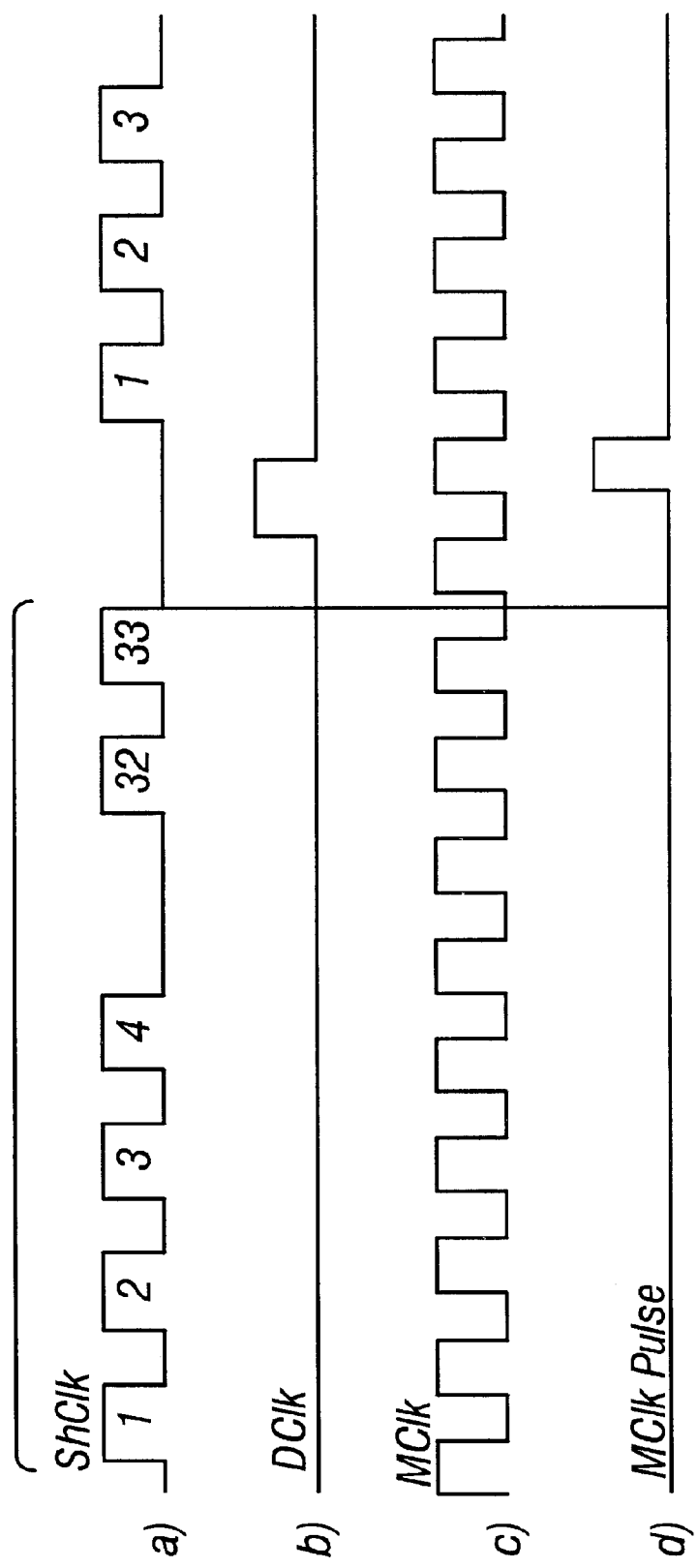
FIGS. 2a–2d illustrate the clock signals utilized in the embodiment of FIG. 1.

FIGS. 2a–2d illustrate some of the clock signals utilized in FIG. 1. FIG. 2a is a shift clock signal ShClk that is used to drive the scan chain. This shift clock signal ShClk goes through 33 cycles during which the 33 bits of a program instruction are loaded into the scan chain. After the program instruction has been loaded, it is transferred to the instruction pipeline 16 as all the instructions move along the instruction pipeline. The instruction at the front of the instruction pipeline 16 is to be executed by the processor core 4 and accordingly either the test clock signal DClk of FIG. 2b or the system clock signal MClk must be selected in dependence upon the clock selecting bit S.

In the case of a program instruction that is to be executed with the test clock system DClk of FIG. 2b, a test clock signal pulse is issued by the external controlling apparatus and is routed to the processor core 4 via the clock multiplexer 12. This is illustrated in FIG. 2b.

In the case of a program instruction that is to be executed with the system clock signal MClk of FIG. 2c, an appropriate pulse from within the system clock signal MClk must be selected. The clock synchronizer 14 monitors the system clock signal MClk of FIG. 2c following receipt of an appropriate clock selecting bit signal S and identifies the first valid system clock pulse that may be used, as shown in FIG. 2d, and switches the clock multiplexer 12 to route this to the processor core 4. In the case illustrated, the first system clock pulse in FIG. 2c that occurred following the complete loading of the program instruction was too soon after the previous clock pulse and so was not passed for use.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data, said apparatus comprising:
   (i) a processor core operable under control of program instructions;
   (ii) a clock circuit for supplying a system clock signal to said processor core;
   (iii) a test clock circuit for supplying a test clock signal to said processor core;
   (iv) a clock selector for selecting which one of said system clock signal and said test clock signal drives operation of said processor core; and
   (v) an auxiliary circuit coupled to said processor core and driven by said system clock signal irrespective of which clock signal is selected for supply to said processor core by said clock selector, said auxiliary circuit being accessed by said processor core only when executing a program instruction from a subset of said program instructions;
   (vi) wherein said clock selector selects said system clock signal during normal operation and said test clock signal during loading of program instructions during test operation, said clock selector being responsive to one or more clock selecting bits within each program instruction to be executed during said test operation to select independently for each program instruction either said test clock signal or said system clock signal for driving said processor core to execute that program instruction, said clock selector selecting said system clock signal to drive operation of said processor core during test operation to execute a program instruction from said subset of program instructions such that operation of said processor core is synchronized with said auxiliary circuit.

2. Apparatus as claimed in claim 1, wherein said auxiliary circuit comprises a memory circuit.

3. Apparatus as claimed in claim 1, wherein said auxiliary circuit comprises a coprocessor.

4. Apparatus as claimed in claim 1, comprising an instruction pipeline via which program instructions are fed to said processor core, said clock selector receiving said one or more clock selecting bits from a pipeline stage of said instruction pipeline holding a next instruction to be executed by said processor core.

5. Apparatus as claimed in claim 1, wherein during test operation, each program instruction, including said one or more clock selecting bits, is serially loaded under control of said test clock signal prior to being applied to said processor core.

6. Apparatus as claimed in claim 5, comprising a test scan chain into which said program instructions are serially loaded during test operation.

7. Apparatus as claimed in claim 1, wherein, during normal operation, each program instruction is loaded in parallel from a program memory, said one or more clock selecting bits being separately added to said program instructions read from said program memory.

8. A method of processing data, said method comprising the steps of:
   (i) operating a processor core under control of program instructions;
   (ii) supplying a system clock signal to said processor core;
   (iii) supplying a test clock signal to said processor core; and
   (iv) selecting which one of said system clock signal and said test clock signal drives operation of said processor core, wherein
   (v) an auxiliary circuit is coupled to said processor core and is driven by said system clock signal irrespective of which clock signal is selected for supply to said processor core, said auxiliary circuit being accessed by said processor core only when executing a program instruction from a subset of said program instructions;
   (vi) said system clock signal is selected during normal operation;
   (vii) said test clock signal is selected during loading of program instructions during test operation;
   (viii) one or more clock selecting bits within each program instruction to be executed during said test operation independently controls for each program instruction selection of either said test clock signal or said system clock signal for driving said processor core to execute said program instruction; and
   (ix) said system clock signal is selected to drive operation of said processor core during test operation to execute a program instruction from said subset of program instructions such that operation of said processor core is synchronized with said auxiliary circuit.

* * * * *